Nov. 10, 1942.   F. P. LAWLER   2,301,782
FAIR-LEAD
Filed Jan. 30, 1941
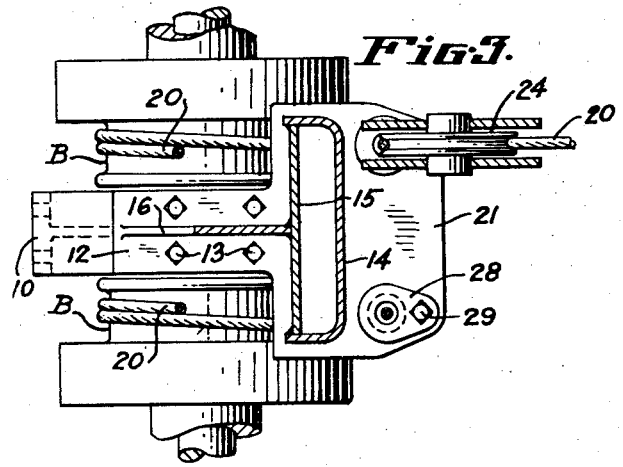
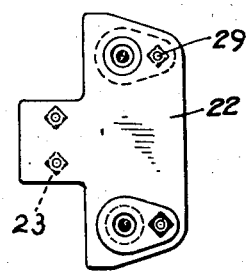
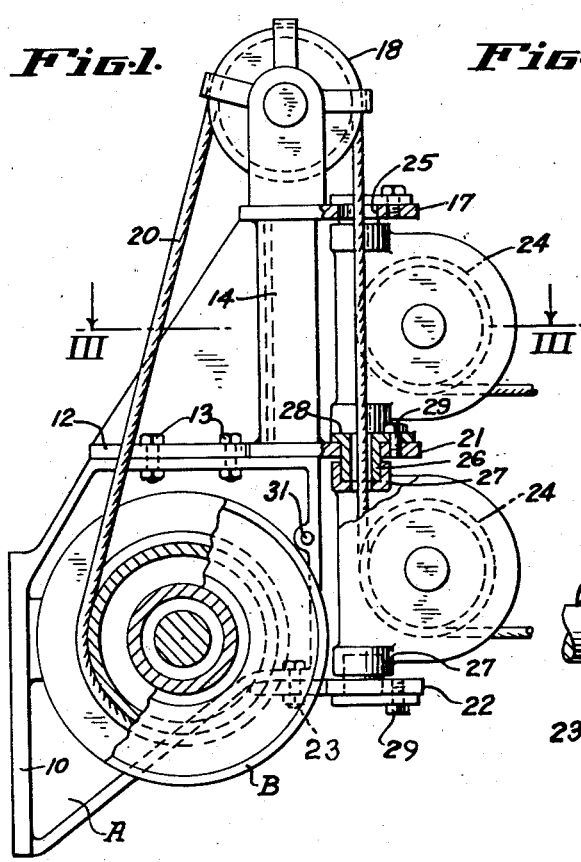
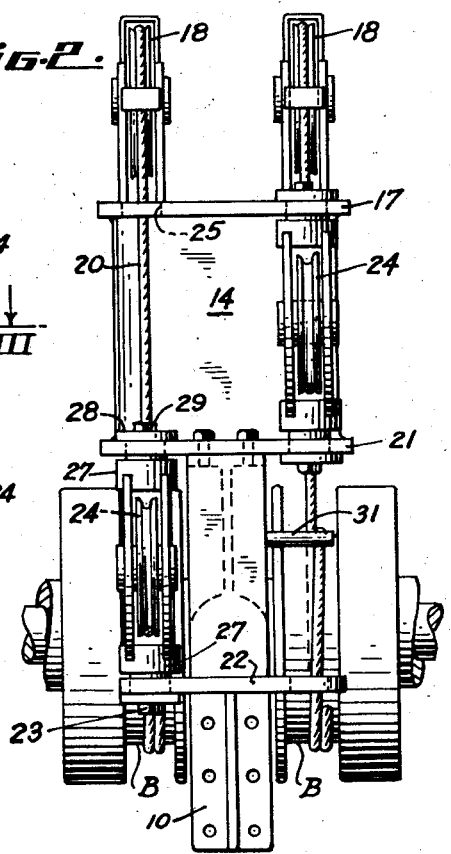
INVENTOR.
FRANK P LAWLER
BY
Castberg and Roemer
ATTORNEYS.

Patented Nov. 10, 1942

2,301,782

UNITED STATES PATENT OFFICE 2,301,782

FAIR-LEAD

Frank P. Lawler, Chicago, Ill., assignor, by mesne assignments, of one-third to Charles H. Grant, San Francisco, Calif., one-third to Frank P. Lawler, Chicago, Ill., and one-third to Paul J. Tyler, Oroville, Calif.

Application January 30, 1941, Serial No. 376,567

2 Claims. (Cl. 254—190)

This invention relates to fair-leads or cable guides for hoisting drums, and particularly to a double deck fair-lead, or fair-leads adapted to be conveniently arranged at different elevations for particular application to hoisting apparatus designed to be mounted on the rear of a tractor or the like, so that it may be driven by the tractor, and employed in controlling cable-operated equipment which is either mounted on, or drawn or pushed by the tractor, or for any combination of equipment which is associated with or operated by a tractor.

It is the object of the present invention to provide a fair-lead structure for hoisting drums having a double deck arrangement adapted for interchangeable mounting of lead-in swiveled sheaves at different elevations, the upper deck or elevation of which is intended for leading a cable generally toward the side and front of a tractor upon which the hoisting drum is mounted, for operating front-mounted or pushed equipment, while the lower elevation or deck is arranged for leading the cable generally rearwardly from the tractor, for operating equipment which is drawn or pulled by the tractor draw-bar; to provide a fair-lead structure in which the lead-in swiveled sheaves when mounted on the lower deck are as close as possible to the level of the draw-bar of the tractor without interfering with its necessary free movement, and in which the cable line pull directed thereto will therefore have minimum objectionable effect of tending to rear up or raise the front of the tractor during operation, in such a manner as to impair or reduce its stability and pulling ability; to provide a fair-lead structure in which the lead-in swiveled sheaves when mounted at their upper position or on the upper deck are sufficiently high to facilitate running lines from them sidewise and thence forwardly, above and clear of the track-laying elements of the tractor, for efficiently operating front-mounted or pushed equipment; to provide a double deck fair-lead which is simple in its construction and operation and which is so arranged that it may conveniently be constructed in any multiple, depending upon the number of hoisting drums employed; and further, to provide such a structure in which all of the moving and wearing parts are readily accessible for replacement and repair.

Further objects and advantages of the present invention are made apparent in the following specification, wherein reference is made to the accompanying drawing, in which one form of the invention is described for purposes of illustration. In the drawing—

Fig. 1 is a side elevation with parts broken away and parts in section, illustrating a fair-lead structure embodying the present invention;

Fig. 2 is a rear elevation of the structure illustrated in Fig. 1;

Fig. 3 is a horizontal sectional view taken on line III—III of Fig. 1; and

Fig. 4 is a plan view of a deck or plate member shown in Figs. 1 and 2, illustrating details of construction thereof.

The present invention is intended for use in the general manner of the cable fair-lead arrangement disclosed in my co-pending application entitled "Fair-lead," filed February 19, 1938, Serial No. 191,505, now Patent No. 2,256,982, dated September 23, 1941, and is adapted for use in connection with hoisting drums of the type shown and fully described in my Patent No. 2,199,668, entitled "Hoist," issued May 7, 1940.

The hoist structure upon which the fair-lead is mounted and in conjunction with which it is used is shown generally in the accompanying drawing as comprising a central power transmitting housing A adapted to be bolted, through the medium of a flange 10 and suitable bolts, not shown, to the rear end of a tractor. On opposite sides of the housing A are journaled hoisting drums B—B to which power is transmitted from the power takeoff of the tractor.

The fair-lead structure forming the subject matter of the present invention comprises a base plate 12 secured as by bolts 13 or other suitable means to the top of the transmission housing A. Supported on this base plate is a column 14 formed, as best illustrated in Fig. 3, of a channel-like section and a plate 15 welded thereto to form a rigid box-like structure. This column 14 is braced with relation to the base plate 12 by a brace or web 16, and the column forms a support for a top plate 17 which, as will hereinafter be described, cooperates with a middle plate and a bottom plate to form two stations or decks at which the lead-in sheaves of the fair-lead may be positioned. The base plate 12, column 14 and brace plate 16, as well as the top plate 17, are preferably all welded with relation to each other, or otherwise formed to provide a rigid, substantial frame member which functions as a support for a pair of upper stationary cable sheaves 18—18, the function and structure of which are fully described in my co-pending application above referred to, and which, briefly stated, serve to guide the cables 20 as they leave the drums B—B to a position above and in vertical alignment with the hollow pintles or bearings of the lead-in sheaves. The base plate 12 extends rearwardly from the column 14 to form a middle plate 21; and a bottom plate 22, the shape of which is illustrated in Fig. 4, is secured to the transmission housing A by means of bolts 23, and extends rearwardly to underlie the top plate 17 and middle plate 21. The distance between the top and middle plates is substantially equal to the distance between the middle plate and bottom plate.

This structure permits a pair of swiveled sheaves 24 to be mounted between the plates 17 and 21, in which position they may be said to be mounted on the upper deck, and permits the same sheaves to be mounted between the middle plate 21 and the bottom plate 22, in which position they are said to be mounted on the lower deck. In Figs. 1 and 2, one of the sheaves 24 is shown on the upper deck and the other on the lower deck.

In order that these sheaves may be mounted to swivel freely in either the upper or the lower deck position, and in order that they may be freely interchangeable from one position to the other, each of the plates 17, 21 and 22 is provided with a pair of perforations, as indicated at 25, and these pairs of perforations are in vertical alignment with each other. Hollow pintle bearings, as shown at 26, are provided to fit within the perforations, and to have an end which projects downwardly or upwardly, as the case may be, into a socket 27 formed in the housings of the sheaves 24. The hollow pintles 26 are provided with flanges 28, perforated for the reception of capscrews 29 which may be provided one or more for each pintle, and which may be screwed into tapped holes provided in the plates 17, 21 and 22 for the purpose of securing the pintles against endwise displacement. With this structure, the capscrews may be removed to free the pintles 26 so that they may be withdrawn from the perforations and the swiveled sheaves removed and replaced in a different position on the same deck, or in the same position on another deck.

Fig. 1 illustrates the manner in which a cable led over a fair-lead swiveled sheave on the lower deck will lead in at a position, that is, low or adjacent the level of the tractor drawbar, for equipment operating behind the tractor; and it also illustrates the manner in which a cable starting from a hoisting drum in the same position may be led over a swiveled sheave on the upper deck at a position considerably higher and convenient for leading it sidewise and thence forwardly for the control of equipment positioned in front of the tractor. The swiveled sheaves mounted on either deck, in the manner shown, are of course capable of swinging movement through a wide arc in a horizontal plane without obstruction by any part of the hoisting mechanism or tractor, and when the swiveled sheave is mounted on the lower deck the cable, which comes from the hoisting drum and passes over the sheave 18, extends downwardly through the perforations 25 in the top plate 17, which is in a direct line with the axis upon which the sheave is mounted to swivel.

As illustrated in Figs. 1 and 2, cable guards 31 may be carried by the housing A to project over the drums and prevent the cable from coming off in the event it becomes slack during operation.

While the foregoing description is more or less specific, for purposes of clearly illustrating the present invention, the invention is not intended to be limited except by the scope of the appended claims.

Having thus described my invention, what I claim and desire to secure by Letters Patent is:

1. In combination with a hoisting drum and a stationary sheave supported adjacent thereto over which a cable reeled upon the drum may be led, a swivel lead-in sheave, and means for mounting the lead-in sheave at different levels below the stationary sheave with its swivel disposed on an axis common to that of the cable leaving the stationary sheave.

2. In combination with a hoisting drum and a stationary sheave supported adjacent thereto over which a cable reeled upon the drum may be led, a swivel lead-in sheave, and means for mounting the lead-in sheave at different levels below the stationary sheave with its swivel disposed on an axis common to that of the cable leaving the stationary sheave, said means comprising a plurality of equally spaced plates having aligned perforations concentric to said axis and hollow pintles adapted to be secured in said perforations and extending into swivel bearings formed on the lead-in sheave.

FRANK P. LAWLER.